(12) United States Patent
Bello et al.

(10) Patent No.: US 7,689,759 B2
(45) Date of Patent: Mar. 30, 2010

(54) METHOD AND APPARATUS FOR PROVIDING CONTINUOUS ACCESS TO SHARED TAPE DRIVES FROM MULTIPLE VIRTUAL TAPE SERVERS WITHIN A DATA STORAGE SYSTEM

(75) Inventors: Keith A. Bello, Oro Valley, AZ (US); Gregory T. Kishi, Oro Valley, AZ (US); Duke A. Lee, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/846,583

(22) Filed: Aug. 29, 2007

(65) Prior Publication Data

US 2009/0063748 A1 Mar. 5, 2009

(51) Int. Cl.
G06F 12/00 (2006.01)
(52) U.S. Cl. .......................................................... 711/4
(58) Field of Classification Search ........................ None
See application file for complete search history.

(56) References Cited

U.S. PATENT DOCUMENTS

| | | | |
|---|---|---|---|
| 6,779,058 B2 * | 8/2004 | Kishi et al. | 710/60 |
| 7,039,657 B1 * | 5/2006 | Bish et al. | 707/203 |
| 7,072,994 B2 * | 7/2006 | Britton | 710/9 |
| 7,209,932 B2 * | 4/2007 | Dewey | 707/203 |
| 7,379,988 B2 * | 5/2008 | Bish et al. | 709/223 |
| 2005/0251547 A1 * | 11/2005 | Bello et al. | 709/200 |
| 2005/0262296 A1 * | 11/2005 | Peake | 711/111 |

OTHER PUBLICATIONS

IBM, *Method for Continuous Access to Shared Removable Media and Devices from Multiple Nodes*; Feb. 8, 2007, pp. 1-3; IP.com No. IPCOM000146223D, www.ip.com USA.

* cited by examiner

*Primary Examiner*—Hiep T Nguyen
(74) *Attorney, Agent, or Firm*—Dillon & Yudell LLP (57) ABSTRACT

A method for providing continuous access to shared tape drives from two virtual tape server (VTS) nodes is disclosed. A group of tape drives are connected to two VTS nodes via a set of switches. Both VTS nodes can concurrently process requests to mount physical tape cartridges to separate tape drives. The selection of a tape drive to fulfill a volume mount request on a physical volume begins by locking down any access to a tape drive table having a composite view of all the tape drives shared between the two VTS nodes. An available tape drive is then selected to mount the physical volume, and an entry in the tape drive table is updated to claim ownership of the tape drive. A reservation command is sent to the tape drive to lock down any access to the tape drive, and the lock to the tape drive table is released. Having claimed ownership to the tape drive, the VTS node can now perform the volume mount request.

12 Claims, 6 Drawing Sheets

METHOD AND APPARATUS FOR PROVIDING CONTINUOUS ACCESS TO SHARED TAPE DRIVES FROM MULTIPLE VIRTUAL TAPE SERVERS WITHIN A DATA STORAGE SYSTEM

BACKGROUND OF THE INVENTION

1. Technical Field

The present invention relates to data storage systems in general, and more particularly, to data storage systems having shared tape drives. Still more particularly, the present invention relates to method and apparatus for providing continuous access to shared tape drives from multiple virtual tape servers within a data storage system.

2. Description of Related Art

In a hierarchical data storage system, expensive and fast access storage devices are commonly paired with arrays of cheaper and relatively slower access data storage devices. Expensive and high-speed storage devices can be, for example, direct access storage devices (DASDs), while cheaper and slower storage devices can be, for example, tape drives.

A virtual tape storage system is a hierarchical data storage system. A virtual tape storage system may include one or more virtual tape servers (VTSs) along with one or more tape storage and retrieval systems such as the TotalStorage® 3494 Enterprise Tape Library manufactured by the International Business Machines Corporation of Armonk, N.Y.

During operation, a virtual tape storage system may communicate with one or more host computers. However, a conventional VTS within a virtual tape storage system does not support operations in a multi-node environment. Thus, when there is a malfunction within a conventional VTS, it is very difficult to locate the source of the problem. The process of identifying and correcting a problem often involves customer technical support team, support center, VTS developers, etc. VTS down time, in many cases, is disruptive to customers. Consequently, it would be desirable to provide a method for managing multiple controllers that share multiple tape drives within a data storage system such that continuous access can be provided to the shared tape drives from multiple controllers.

SUMMARY OF THE INVENTION

In accordance with a preferred embodiment of the present invention, two virtual tape server (VTS) nodes are coupled using a computer network to provide a highly available dual node virtual tape management system, both sharing a common physical tape library. Both VTS nodes are capable of actively and simultaneously process requests to mount physical tape cartridges to separate physical tape drives to access data. The combination of a database table and a SCSI reservation command is utilized to claim ownership of a tape drive. An ownership lock field in the database table prevents the same tape drive to be selected for use until the ownership is released. The SCSI reservation command provides a second layer of protection at the drive level. A highly available disaster recovery (HADR) module residing on each of the two nodes cooperate on a computer network to delegate the database on one node to be the primary database and the other node's database to be the secondary database. The local HADR module redirects all database requests from the node associated with the secondary database to the node associated with the primary database. The HADR modules keep both the primary and secondary databases synchronized. Both VTS nodes communicate with each other through the computer network to report operational status. When one of the VTS node having the primary database fails during operation, the HADR module on the other VTS node automatically switches the secondary database role to take on the primary database role.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
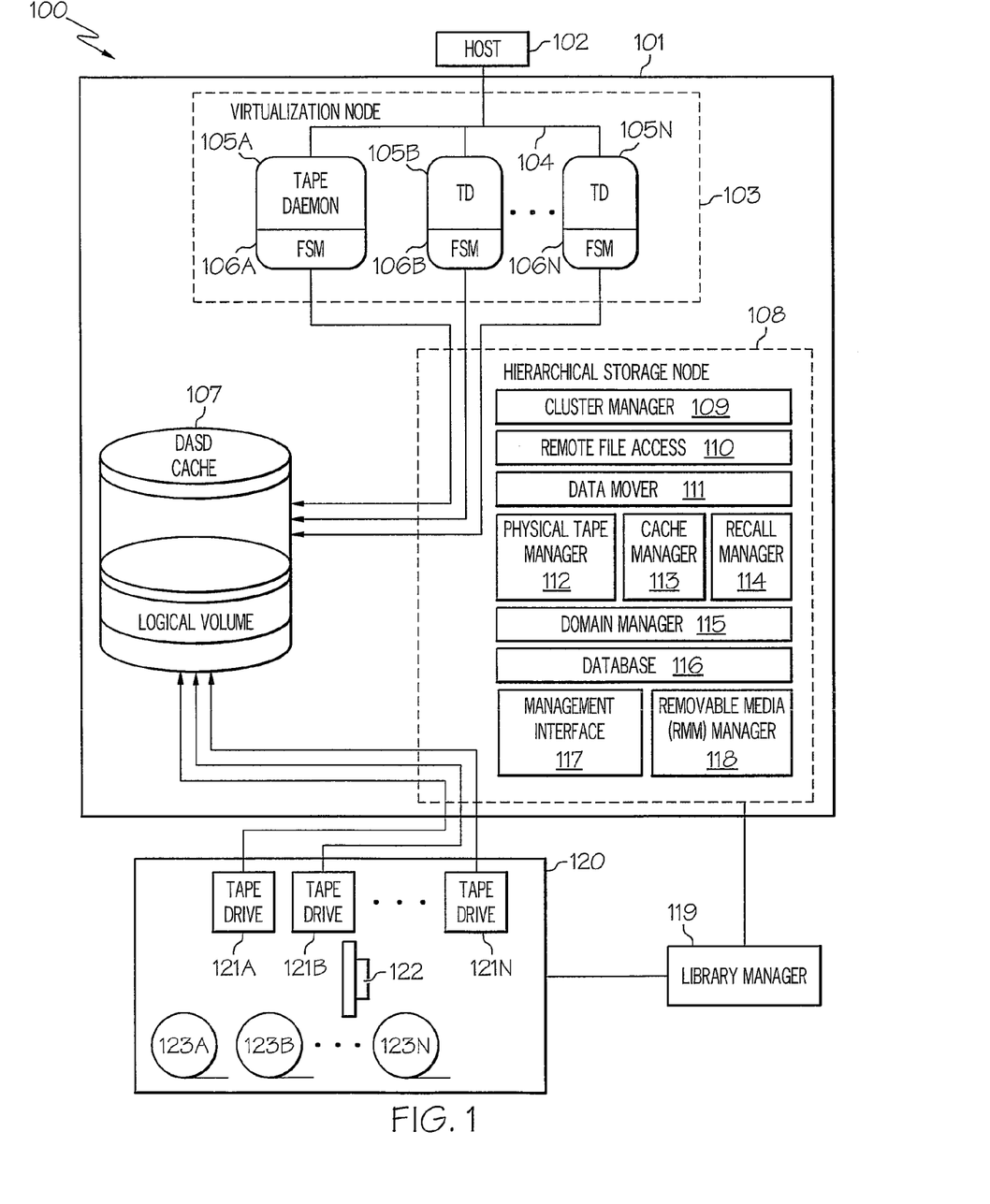
FIG. 1 is a block diagram of a tape management system, in accordance with a preferred embodiment of the present invention.

With reference now to the drawings, and in particular to FIG. 1, there is illustrated a block diagram of a tape management system, in accordance with a preferred embodiment of the present invention. As shown, a virtual storage system 100 includes a virtual tape server 101, a tape library 120, and a library manager 119. A host computer 102 is linked to virtual tape server 101 via a network connection, e.g., TCP/IP, LAN, Ethernet, and the IBM Enterprise System Connection (ESCON) (not shown). Host computer 102 is a computer, such as a personal computer, workstation or mainframe, that is linked to virtual tape server 101 via an ESCON channel. Virtual tape server 101 is a computer, such as a personal computer, workstation or mainframe, that is associated with a direct access storage device (DASD) cache 107. DASD cache 107 preferably includes one or more logical volumes. DASD cache 107 includes multiple hard disks that are spaced into redundant array of inexpensive disk (RAID) arrays.

Tape library 120 includes multiple tape drives 121A-121N, such as International Business Machine (IBM) TS1100 or Jaguar 3592 tape drives or any other tape drive known in the art. Generally, a removable storage volume, e.g., a tape cartridge 123A-123N, is loaded into each of the tape drives. Tape drives 121A-121N are serviced by an accessor (e.g., a robot) 122 that transfers selected tape cartridges 121A-121N among tape drives 121A-121N and their corresponding positions within a tape cartridge repository.

Tape library 120 includes storage management software utilized to monitor the active space on the tape cartridges and schedule reclamations of tape cartridges when the system is less active. Tape library 120 is a tape library system such as the IBM Virtualization Engine TS 7740 and IBM Magstar 3494 Tape Library. Library manager 119 is utilized in virtual storage system 100 to install, maintain, configure, and operate tape library 120. Within automated library 120, accessor 122 may be controlled utilizing a library manager 119 based upon inputs received from removable media manager 118.

DASD cache 107, which includes a tape volume cache, provides a cache for data stored in tape library 120. DASD cache 107 maintains logical volumes as logical volume files that are concatenated into physical volume files in the tape cartridges loaded in the tape drives located within tape library 120. When a logical volume file in DASD cache 107 moves to a tape drive in a tape library 120, the logical volume file is written to a physical volume file on a tape cartridge in the actual tape drive. When a physical volume file is recalled for a tape drive and moved to DASD cache 107, the physical volume file then becomes a logical volume file in DASD cache 107. In this way, DASD cache 107 provides a window to host computer 102 of all the physical volume files in tape library 120.

Virtual tape data storage system includes a virtualization node 103 having multiple virtual tape daemons, generally designated as tape daemons 105A-105N, that represent and emulate virtual tape devices to host computer 102. The operating system of host system 102, in turn, manages the presentation of the virtual tape devices to the systems users (not shown). Host computer 102 views the virtual tape devices as actual drives and when host computer 102 attempts to access a logical volume in a selected virtual tape device, the respective virtual tape daemon associated with the virtual tape device requested by host computer 102 will handle the host access request.

Host-to-DASD cache data transfer in the illustrated virtual tape data storage subsystem may be controlled by VTS code via a cluster manager process 111 within a hierarchical storage node (HSN). For example, a cluster manager 111 within virtual storage system 100 intercepts and processes the access request from virtual tape daemons 105A-105N. Cluster manager 111 then carries out host system 102's request to access the logical volume file on DASD cache 107. Host-to-DASD cache data transfer is directly controlled by a file system manager (FSM) 106A-106N that handles DASD read and write commands.

Similarly, an interface between DASD cache 107 and tape storage drive 121 may be controlled by removable media manager (RMM) 118. For example, when cluster manager 109 attempts to mount a logical volume file that is not located in DASD cache 107, cluster manager 109 communicates the access request to the recall manager 114, which in turn forwards the request to data mover 111. If the tape in the access request is already mounted in a tape drive in tape library 120, RMM 118 will immediately inform data mover 111 to access the physical volume for the requested logical volume file from the mounted tape. However, if the requested file on a tape is not presently mounted in a tape drive, RMM 118 will initiate a request to library manager 119 to mount the tape containing the physical volume corresponding to the requested logical volume file.

Data mover 111 migrates entire logical volume files from DASD cache 107 to tape library 120. When the available space in DASD cache 107 reaches a predetermined level or after a predetermined time period, cache manager 113 will direct data mover 111 to migrate logical volume files from DASD cache 107 to tape library 120 for archival therein.

Further, RMM 118 may diagnose errors or determine the origin of errors that are detected (e.g., tape drive 121 or tape cartridge 123). RMM records the errors into an error event table in the database 116. Based on the history of errors in the database 116, RMM 118 may take appropriate action to create an error recovery procedure (ERP). If an ERP requires operator assistance, an operator intervention may be posted to management interface 117. Management interface 117 provides information about the system and allows user control and configuration of the system.

As explained above, host 102 access data that resides in DASD cache 107. When a service has to be done to virtual tape storage system 100 (e.g., installing new microcode, upgrading the DASD cache), virtual tape system 100 is taken offline to host computer 102. Host computer 102 no longer has access to data in DASD cache 107 nor can data be obtained from physical cartridges 123A-123N. There arises the need to have virtual tape storage system 100 that can provide continuous access to customer data while service is in progress. The customer data may reside on physical tape cartridges 123A-123N that must be mountable to physical tape drives 121A-121N. A method could be developed to share the physical library 120 simultaneously from two VTS nodes such that both can process host request simultaneously or solely if one VTS node is being serviced.

Figure 2:
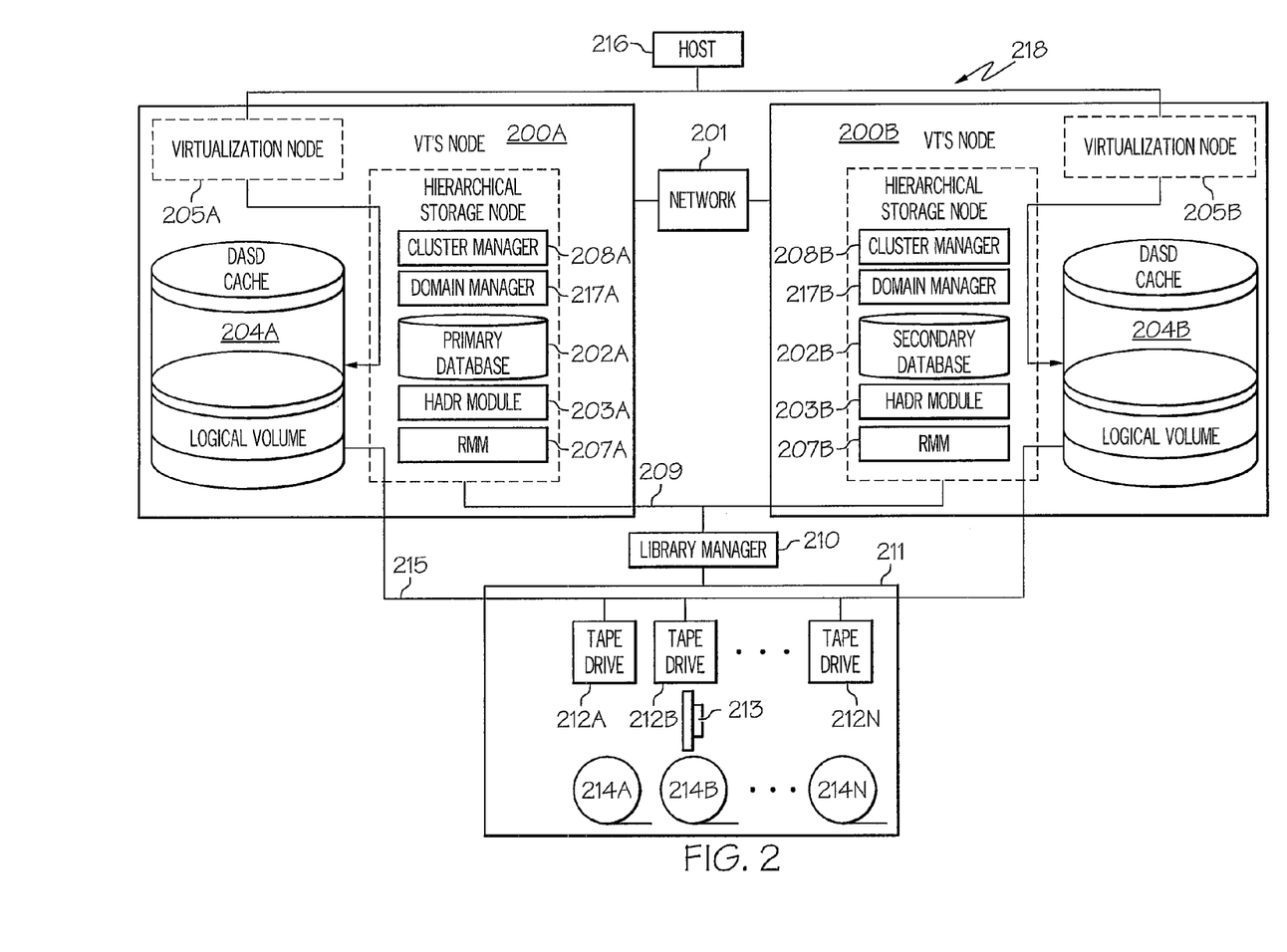
FIG. 2 is a block diagram of a dual-node data storage system, in accordance with a preferred embodiment of the present invention.

With reference now to FIG. 2, there is depicted a block diagram of a dual-node virtual storage system, in accordance with a preferred embodiment of the present invention. As shown, a dual-node virtual storage system 218 includes a virtual storage system node 200A and a virtual storage system node 200B interconnected to each other via a computer network 201. Virtual storage system node 200A includes a DASD cache 204A, a virtualization node 205A and a hierarchical storage node 206A. Hierarchical storage node 206A includes a cluster manager 208A, a domain manager 217A, a primary database 20A, a RMM 207A, and a high disaster availability recovery (HADR) module 203A. Similarly, virtual storage system node 200B includes a DASD cache 204B, a virtualization node 205B, and a hierarchical storage node 206B. Hierarchical storage node 206B includes a cluster manager 208B, a domain manager 217B, a primary database 20B, a RMM 207B, and a HADR module 203B. Not shown in hierarchical storage node 206A and hierarchical storage node 206B are modules from FIG. 1 such as remote file access server 110, data mover 111, physical tape manager 112, cache manager 113, recall manager 114, and management interface 117.

Both virtual storage node 200A and virtual storage node 200B are capable of communicating with each other through computer network 201. Both virtual storage node 200A and virtual storage node 200B share the same library manager 210 and can communicate with library manager 210 via computer network 209. Both virtual storage node 200A and virtual storage node 200B share the same physical library 211 including physical tape drives 212A-212N, physical cartridges 214A-214N, and robotic accessor 213. Both virtual storage node 200A and virtual storage node 200B communicate with physical tape drives 212A-212N through network 215 (e.g., fiber channel switches).

RMMs 207A and 207B are responsible for choosing a drive for physical cartridge mount requests (a process known as drive selection) and mounting cartridge 214 to a selected drive 212 through library manager 210. For example, RMM 207A receives a mount request for a particular cartridge. RMM 207A communicates with HADR module 203A to select a drive (the chosen drive is in the form of a drive record). HADR module 203A processes the drive selection request using primary database 202A. Similarly, RMM 207B receives a mount request for a different cartridge. RMM 207B communicates with HADR module 203B to select a drive.

HADR module 203B processes the drive selection request by redirecting the request to HADR module 203A via computer network 201. HADR module 203A intercepts the drive selection request from HADR module 203B, selects a drive using primary database 202A, passes the response including the selected drive record back to HADR module 203B. HADR module 203B returns the selected drive record to RMM 207B.

Besides serializing database access (in the above example) HADR modules 203A and 203B are responsible for synchronizing the database information between primary database 202A and secondary database 202B. HADR modules 203A and 203B also coordinate with each other to decide if database 202A or database 202B should be primary database and the other to be the secondary database. In other words, the role of primary database 202A is not fixed. For example, if virtual storage system node 200A is brought down for service and both primary database 202A and secondary database 202B are in sync, HADR module 202B will switch the role of database 202B to be the primary database. When virtual storage system node 200A is brought online at a later time, HADR modules 202A and 202B will communicate to synchronize databases 202A and 202B, and may set the role of database 202A to the secondary database.

One of RMMs 207A and 207B is allowed to take ownership of a physical drive from another one of RMMs 207A and 207B if such RMM had failed due to an unexpected error condition. For example, RMM 207A in virtual storage system node 200A claimed ownership of physical drive 212A and is recalling data from the cartridge 214A to DASD 204A. Virtual storage system 200A encounters a fatal error that brought the system offline to host computer 216 without going through the normal process of releasing all resources held by virtual storage system 200A. Domain manager 217B normally receives "heart beats" (i.e., messages that indicate the health of a system) from domain manager 217A on a regular time interval, but since virtual storage system 200A went offline, domain manager 217B stops receiving heart beats from and fails to send heart beats to domain manager 217A. After a specified period of time of consecutive errors, domain manager 217B declares domain manager 217A to be offline. RMM 207B communicates with domain manager 217B to obtain the operational state of virtual storage system 200A and discovers virtual storage system 200A is offline. RMM 207B communicates with HADR module 203B to query the database 202B (now the primary database) to obtain a list of physical drives still owned by RMM 207A. RMM 207B recovers the physical drive 212A that was owned by RMM 207A, including freeing the ownership lock in the drive record. RMM 207B may now use the drive 212A to fulfill a physical mount request.

Figure 3A:
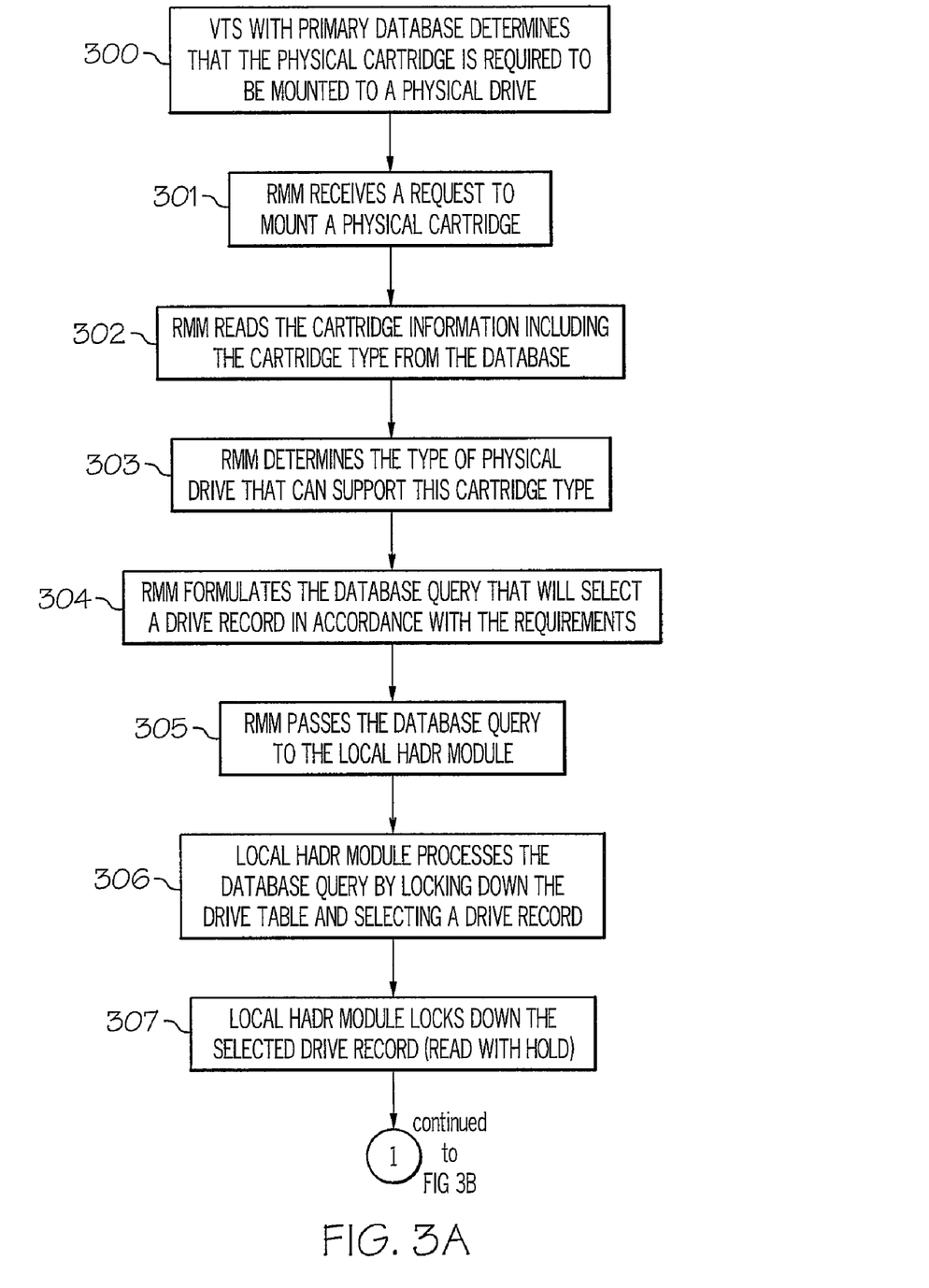
FIGS. 3A and 3B are high-level logic flow diagrams of a method for providing continuous access to shared tape drives and cartridges from different nodes within the dual-node data storage system of FIG. 2, in accordance with a preferred embodiment of the present invention.
Figure 3B:
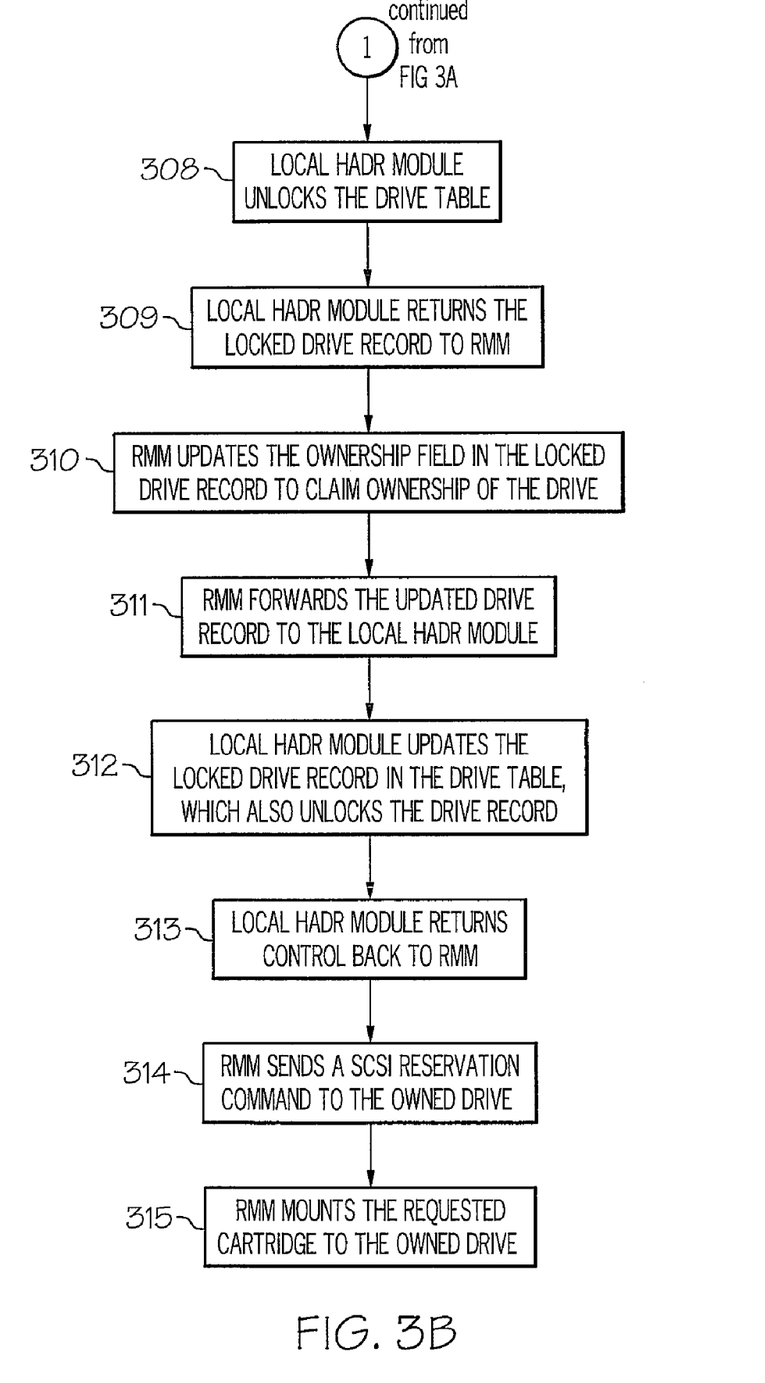

With reference now to FIGS. 3A and 3B, there are depicted high-level logic flow diagrams of a method for providing continuous access to shared physical drives and cartridges within a dual-node virtual storage system, in accordance with a preferred embodiment of the invention. Starting at block 300, a VTS 200A having the primary database 202A determines that the physical cartridge 214 is required to be mounted to a physical drive 212 to access data. RMM 207A receives the cartridge mount request, as shown in block 301. RMM 207A communicates with HADR module 203A to read the cartridge information from the primary database 202A including the cartridge type, as depicted in block 302. A determination is made to find one or more physical drive types 212A-212N that can support the cartridge type, as shown in block 303. RMM 207A uses the information gathered from blocks 302 and 303 to build a database query that will select a drive record according to the requirements, as depicted in block 304.

Next, RMM 207A passes the database query to local HADR module 203A, as shown in block 305. Local HADR module 203A processes the database query by first locking down the drive table (which contains all drive records) and then selecting a drive record from database 202A that matches the criteria specified in the database query, as depicted in block 306. Locking down the drive table prevents access to read or update any drive records in the drive table while the drive selection process is in progress. Once a drive record is selected, remote HADR module 203A locks down the selected drive record (i.e., a read with hold), as shown in block 307. A record locked by the owner can only be updated by the owner.

Next, local HADR module 203A unlocks the drive table from database 202A, as depicted in block 308, which allows other potential database users to continue accessing the drive table. Local HADR module 203A returns the locked drive record to RMM 207A, as shown in block 309. RMM 207A updates the ownership field in the locked drive record to claim ownership of the drive, as depicted in block 310. RMM 207A forwards the updated drive record to HADR module 203A, as shown in block 311. Local HADR module 203A sends a request to remote HADR module 203B to store the updated drive record to database 202B. After updating the remote standby database 202B, local HADR module 203A stores the updated record in the drive table of database 202A and unlocks the drive record, as depicted in block 312. Local HADR module 203A returns control back to RMM 207A, as shown in block 313. RMM 207A now claims ownership of the usage to the drive by sending a SCSI reservation command, as depicted in block 314. At the drive level, a SCSI reservation prevents the second VTS node 200B from unexpectedly trying to use the drive while tape input and output operations are in progress by VTS node 200A. Once ownership has been established in the database drive record 202A and physical drive level 212, RMM 207A issues the mount to the library manager 210 for cartridge 214 to drive 212, as shown in block 315.

Figure 4A:
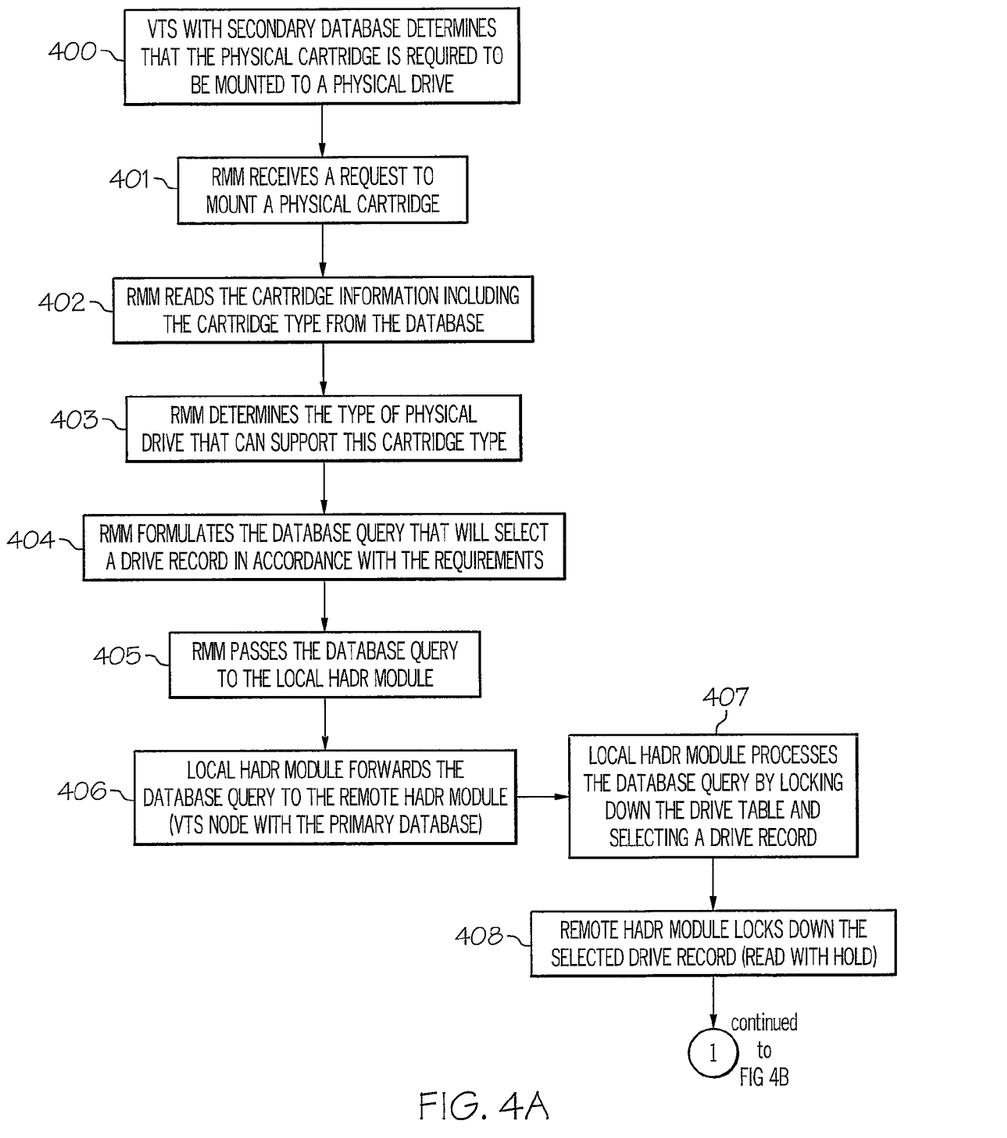
FIGS. 4A and 4B are high-level logic flow diagrams of a method for providing continuous access to shared tape drives and cartridges from different nodes within the dual-node data storage system of FIG. 2, in accordance with an alternative embodiment of the present invention.
Figure 4B:
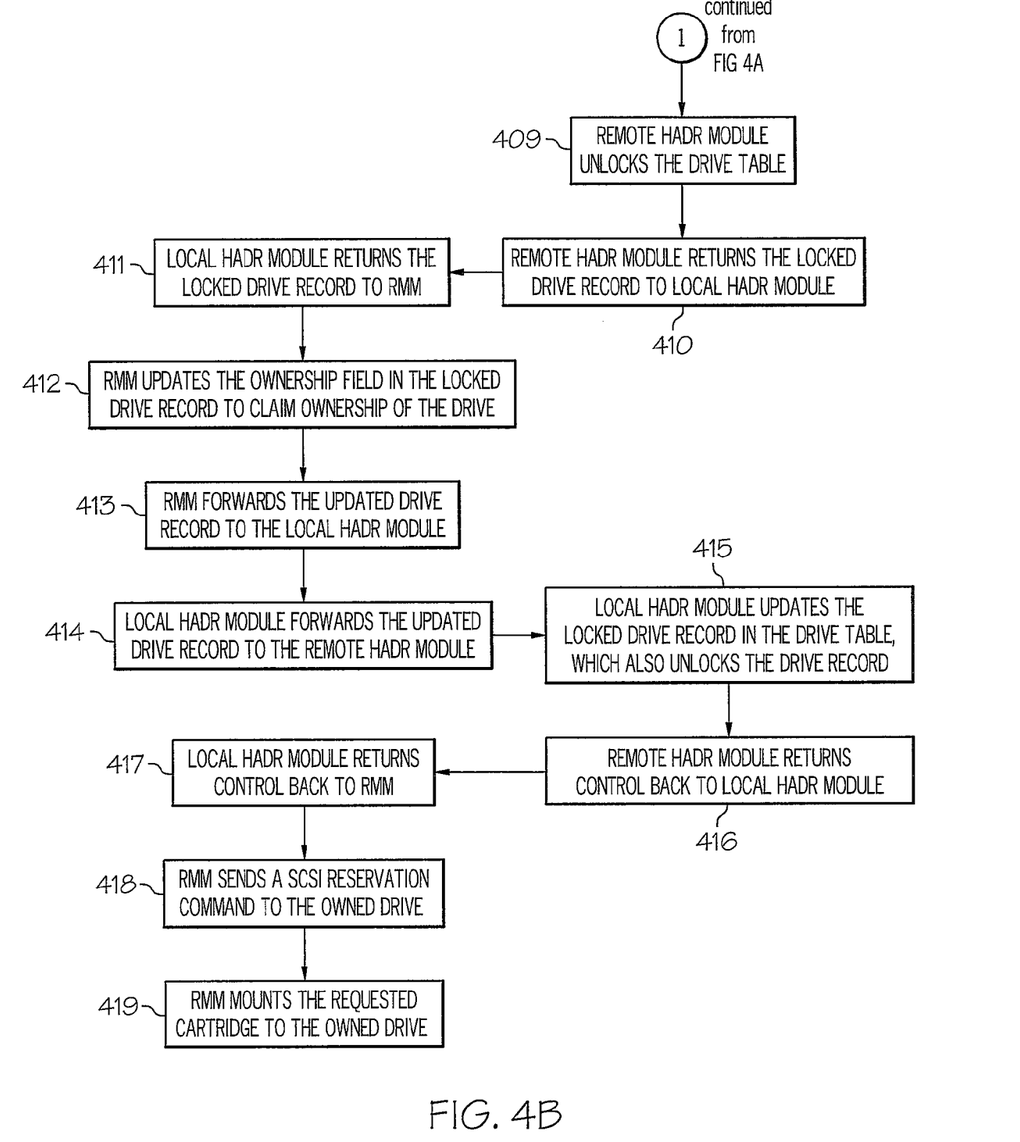

With reference now to FIGS. 4A and 4B, there are depicted high-level logic flow diagrams of a method for providing continuous access to shared physical drives and cartridges within a dual-node virtual storage system, in accordance with an alternative embodiment of the present invention. Starting in block 400, a VTS 200B having secondary database 202B determines that physical cartridge 214 is required to be mounted to a physical drive 212 to access data. RMM 207B receives the cartridge mount request, as shown in block 401. RMM 207B communicates with HADR module 203B (which in turn communicates with HADR module 203A) to read the cartridge information from primary database 202A including the cartridge type, as depicted in block 402. A determination is made to find the one or more physical drive types 212A-212N that can support the cartridge type, as shown in block 403. RMM 207B uses the information gathered from blocks 402 and 403 to build a database query that will select a drive record according to the requirements, as depicted in block 404.

RMM 207B passes the database query to local HADR module 203B, as shown in block 405. Local HADR module 203B forwards the database query to remote HADR module 203A, as depicted in step 406. Remote HADR module 203A processes the database query by first locking down the drive table (contains all drive records) and then selecting a drive record from database 202A that matches the criteria specified in the database query, as shown in block 407. Once a drive record has been selected, remote HADR module 203A locks down the selected drive record (i.e., a read with hold), as depicted in block 408.

Next, remote HADR module 203A unlocks the drive table from database 202A, as shown in block 409, which allows other potential database users to continue accessing the drive table. Remote HADR module 203A returns the locked drive record to local HADR module 203B, as depicted in block 410. Local HADR module 203B returns the locked drive record to RMM 207B, as shown in block 411. RMM 207B updates the ownership field in the locked drive record to claim ownership of the drive, as depicted in block 412. RMM 207B forwards the updated drive record to HADR module 203B, as shown in block 413. Local HADR module 203B sends a request to the remote HADR module 203A to store the updated drive record, as depicted in block 414. Remote HADR module 203A sends a request back to HADR module 203B to update standby database 202B. Local HADR module 203B returns confirmation to remote HADR module 203A of the update completion. Remote HADR module 203A now updates database 202A, as shown in block 415, which also unlocks the drive record. Remote HADR module 203A returns control back to local HADR module 203B, as depicted in block 416. Local HADR module 203B returns control back to RMM 207B, as shown in block 417. RMM 207B now claims ownership of the usage to the drive by sending a SCSI reservation command, as depicted in block 418. Once ownership has been established in primary database drive record 202A (and 202B) and physical drive level 212, RMM 207B issues the mount to library manager 210 for cartridge 214 to drive 212, as shown in block 419.

As has been described, the present invention provides an improved method and apparatus for providing continuous access to shared physical drives and cartridges from multiple VTS nodes within an automated tape library.

While an illustrative embodiment of the present invention has been described in the context of a fully functional computer system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for providing continuous access to shared tape drives from multiple virtual tape server (VTS) nodes, said method comprising:

connecting a first VTS node and a second VTS node to a plurality of tape drives via a plurality of switches, wherein said first VTS node includes an active database and said second VTS node includes a standby database;

redirecting all requests received by said standby database to said active database;

in response to a volume mount request on a physical volume, placing a lock on a tape drive table by one of said two VTS nodes handling said volume mount request to preventing any access to said tape drive table from one of said two VTS nodes not handling said volume mount request;

selecting an available physical tape drive to mount said physical volume and marking an entry within said tape drive table to claim ownership of said physical tape drive by said VTS node handling said volume mount request;

sending drive reservation request to said physical tape drive to prevent any access to said physical tape drive, and releasing said lock on said tape drive table by said VTS node handling said volume mount request; and performing said volume mount request by said VTS node handling said volume mount request.

2. The method of claim 1, wherein said method further includes returning an error status in a determination that said physical volume is not mountable.

3. The method of claim 1, wherein said method further includes returning an error status in a determination that no physical tape drive is available to mount said physical volume.

4. The method of claim 1, wherein said first and second VTS nodes communicate with each other via a computer network.

5. The method of claim 1, wherein said tape drive table includes a composite view of all physical tape drives shared between said two VTS nodes.

6. The method of claim 1, wherein said two VTS nodes communicate each other's system health via periodic "heart beats" such that when one of said two VTS node fails and another one of said two VTS nodes takes ownership of devices from said failed VTS node.

7. A computer storage medium having a computer program product for providing continuous access to shared tape drives from multiple virtual tape server (VTS) nodes, said computer storage medium comprising:

computer program code for connecting a first VTS node and a second VTS node to a plurality of tape drives via a plurality of switches, wherein said first VTS node includes an active database and said second VTS node includes a standby database;

computer program code for redirecting all requests received by said standby database to said active database;

computer program code for, in response to a volume mount request on a physical volume, placing a lock on a tape drive table by one of said two VTS nodes handling said volume mount request to preventing any access to said tape drive table from one of said two VTS nodes not handling said volume mount request;

computer program code for selecting an available physical tape drive to mount said physical volume and marking an entry within said tape drive table to claim ownership of said physical tape drive by said VTS node handling said volume mount request;

computer program code for sending drive reservation request to said physical tape drive to prevent any access to said physical tape drive, and releasing said lock on said tape drive table by said VTS node handling said volume mount request; and computer program code for performing said volume mount request by said VTS node handling said volume mount request.

8. The computer storage medium of claim 7, wherein said computer storage medium further includes computer program code for returning an error status in a determination that said physical volume is not mountable.

9. The computer storage medium of claim 7, wherein said computer storage medium further includes computer program code for returning an error status in a determination that no physical tape drive is available to mount said physical volume.

10. The computer storage medium of claim 7, wherein said first and second VTS nodes communicate with each other via a computer network.

11. The computer storage medium of claim 7, wherein said tape drive table includes a composite view of all physical tape drives shared between said two VTS nodes.

12. The computer storage medium of claim 7, wherein said computer storage medium further includes computer program code for allowing said two VTS nodes to communicate each other's system health via periodic "heart beats" such that when one of said two VTS node fails and another one of said two VTS nodes takes ownership of devices from said failed VTS node.

* * * * *